United States Patent

[11] 3,588,349

[72] Inventors Kazuo Kawai
Tokyo-to;
Sotokichi Shintani, Iruma-gun; Hidetaka Yanagidaira, Ohmiya-shi, Japan

[21] Appl. No. 782,316
[22] Filed Dec. 9, 1968
[45] Patented June 28, 1971
[73] Assignee Kokusai Denshin Denwa Kabushiki Kaisha
Tokyo-to, Japan
[32] Priority Dec. 8, 1967
[33] Japan
[31] 42/78376

[54] DEMODULATION APPARATUS OF A PHASE-MODULATED TELEGRAPHIC WAVE OR WAVES
5 Claims, 9 Drawing Figs.

[52] U.S. Cl. .......... 178/66, 325/320
[51] Int. Cl. .......... H04l 2.7/00
[50] Field of Search .......... 325/320 (Cursory); 178/66, 67

*Primary Examiner*—Ralph D. Blakeslee
*Attorneys*—Robert E. Burns and Emmanuel J. Lobato ABSTRACT: An apparatus for demodulating at least one phase-modulated telegraphic wave by comparing the phase position of the telegraphic wave with the phase position of at least one reference phase wave, where the phase-modulated telegraphic wave is sampled and coded to digital signals of quantized code configuration so that demodulation of the phase-modulated telegraphic wave is performed by repeatedly accumulating, for the duration of each signal element of the phase-modulated wave, comparison results between the coded digital signals and the reference phase wave.

DEMODULATION APPARATUS OF A PHASE-MODULATED TELEGRAPHIC WAVE OR WAVES

This invention relates to apparatus for demodulating at least one phase-modulated telegraphic wave and more particularly to apparatus for demodulating at least one fixed-reference phase-modulated telegraphic wave or at least one differential phase-modulated telegraphic wave.

The phase-modulated telegraphic wave of this type has a plurality of $2^n$ quantum phase positions in accordance with the number $n$ of telegraph channels to be transmitted. In this case, the quantum phase positions of the fixed-reference phase-modulated telegraphic wave are determined, by use of a fixed phase position as a reference, in accordance with the polarity of a single telegraph signal or the combinations of polarities of a plurality of telegraphic signals to be transmitted. On the contrary, the quantum phase positions of the differential phase-modulated wave are determined so that relative phases between two successive adjacent signal elements are determined in accordance with the above mentioned polarity or combination of polarities.

In order to detect the above mentioned phase-modulated telegraphic wave, a phase detector and a low-pass filter connected in cascade to each other are usually used. However, in a case where a plurality of phase-modulated waves arranged in the frequency allocation of (1/T) Hz. are to be demodulated as well as "Kineplex System" or "Rectiplex System" (U.S. Pat. No. 3,353,101 and British Pat. No. 1,008,821), integrators each having an integration duration T are employed instead of the low-pass filter. A Miller integrator is employed as the integrator to increase the time constant and the gain of this integrator. In this case, a relatively large time constant is necessary to give a substantially ideal integration characteristic to the integrator. For this purpose, the time constant of CR (capacitance and resistance) included in the Miller integrator or the amplification gain thereof must be increased. However, if the time constant of CR increases, the time necessary for resetting the integrator increases so that the effective length of each of the signal elements decreases. On the contrary if the amplification gain increases, the drift effect peculiar to DC amplifiers is not avoidable. In consideration of the above mentioned conditions, an actual integrator of this type is designed so that requirements for the three members (time constant of CR, amplification gain, and drift effect) cannot be fully satisfied. Moreover, if the DC amplifier is constructed by use of transistors, the drift effect of this amplifier is affected by a change of air temperature. Even if air conditioning is performed for compensating the change of air temperature, it is very difficult to maintain the drift effect of all the integrators within a desired limit.

An object of this invention is to provide apparatus for demodulation at least one phase-modulated wave operatable in a stable and reliable manner without the above mentioned defects.

In accordance with this invention, a plurality of phase-modulated waves can be time-divisionally demodulated by use of a single demodulation circuit. Moreover, demodulation preciseness can be increased and a compact system can be provided for a plurality of phase-modulated waves in accordance with this invention.

The principle of this invention will be better understood from the following more detailed discussion taken in conjunction with the accompanying drawings, in which the same or equivalent parts are designated by the same reference numerals, characters and symbols, and in which.

Figure 1:
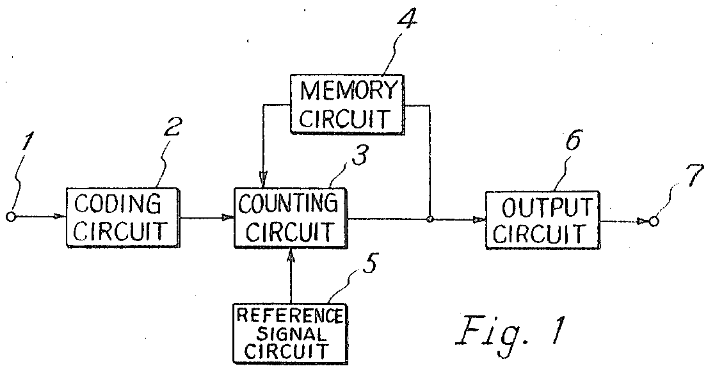
FIG. 1 is a block diagram for describing the principle of this invention.

The principle of this invention will first be described with reference to FIG. 1. A phase-modulated telegraphic wave applied from an input terminal 1 is converted to a digital signal at a coding circuit 2 by coding successive instantaneous levels of successive sampling slots. The code configuration of this coded digital signal may be any type, such as Pulse Code Modulation (PCM) or Pulse Number Modulation (PNM) etc. In this invention, it is essential that the input phase-modulated wave is coded to a quantized digital signal, while it is not essential that the input phase-modulated wave is coded to a digital signal of particular code configuration. The reason for this is as follows. The forementioned defects of the conventional demodulation systems are caused by detecting and integrating the "analogue" voltage of the input phase modulated wave. However, if the input phase-modulated wave is converted to a quantized digital signal, the demodulation operation of this phase-modulated wave can be correctly performed regardless of the drift effect of the operational amplifier. The coded digital signal is then applied to a counting circuit 3 which carries out the adding or subtracting of the coded digital signal and the content of a memory circuit 4. The memory circuit 4 stores the counting result of the counting circuit 3 obtained at the just preceding sampling slot. Whether adding or subtracting is performed in the counting circuit 3 is determined in accordance with the relationship between the polarities of the coded digital signal and a reference signal applied from a reference signal circuit 5. If the polarities of the two signals are the same, adding is carried out; and if the polarities of the two signals are opposite to each other, subtracting is carried out by way of example. The adding or subtracting in the counting circuit 3 corresponds to the phase detecting operation of the input phase-modulated wave, and the superposition of the counting result of a time slot on the counting result of the just preceding time slot stored in the memory circuit 4 corresponds to the integration operation of the detected result. These operations are repeatedly carried out within the duration of a signal element of the input phase-modulated wave, and the sign digit of the last counting result obtained in the duration is read out from the counting circuit 3 to an output circuit 6 to detect the state of the signal element. This read out sign digit is applied to an output terminal 7 through the output circuit 6.

Figure 2:
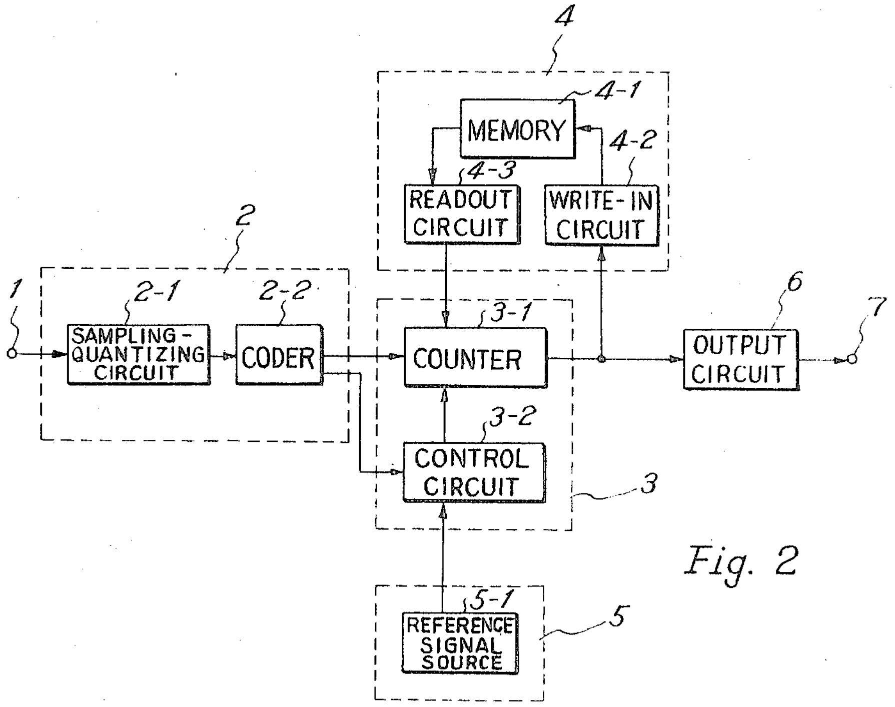
FIG. 2 is a block diagram for illustrating the constructive principle of the apparatus of this invention.

FIG. 2 shows an actual example of the block diagram of FIG. 1. In this example, the coding circuit 2 comprises a sampling-quantizing circuit 2–1 and a coder 2–2; the reference signal circuit 5 comprises a reference signal source 5–1; the counting circuit 3 comprises a counter 3–1 and a control circuit 3–2 for instructing the adding or subtracting to the counter 3–1; and the memory circuit 4 comprises a memory 4–1, such as delay line etc., a write-in circuit 4–2 and a readout circuit 4–3. An input phase-modulated wave applied from the input terminal 1 is sampled by use of a sampling pulse train in which the interval of pulses is considerably shorter than the duration of the signal element of the input phase-modulated wave. The sampled instantaneous levels are successively quantized by an appropriate number of quantum levels. The greater the frequency of the sampling pulse and the number of quantum levels employed, the more precise the forementioned integration operation becomes. The quantized levels are successively applied to the coder 2–2 so as to be coded to an appropriate digital signal of code configuration. In this case, the coder 2–2 is designed so as to fit the code configuration. The memory 4–1, the write-in circuit 4–2, the readout circuit 4–3 and the output circuit 6 are similarly designed so as to fit the code configuration. However, whatever type of code configuration is adopted at the coder 2–2, the principle of construction can be similarly illustrated as shown in FIG. 1.

Figure 3:
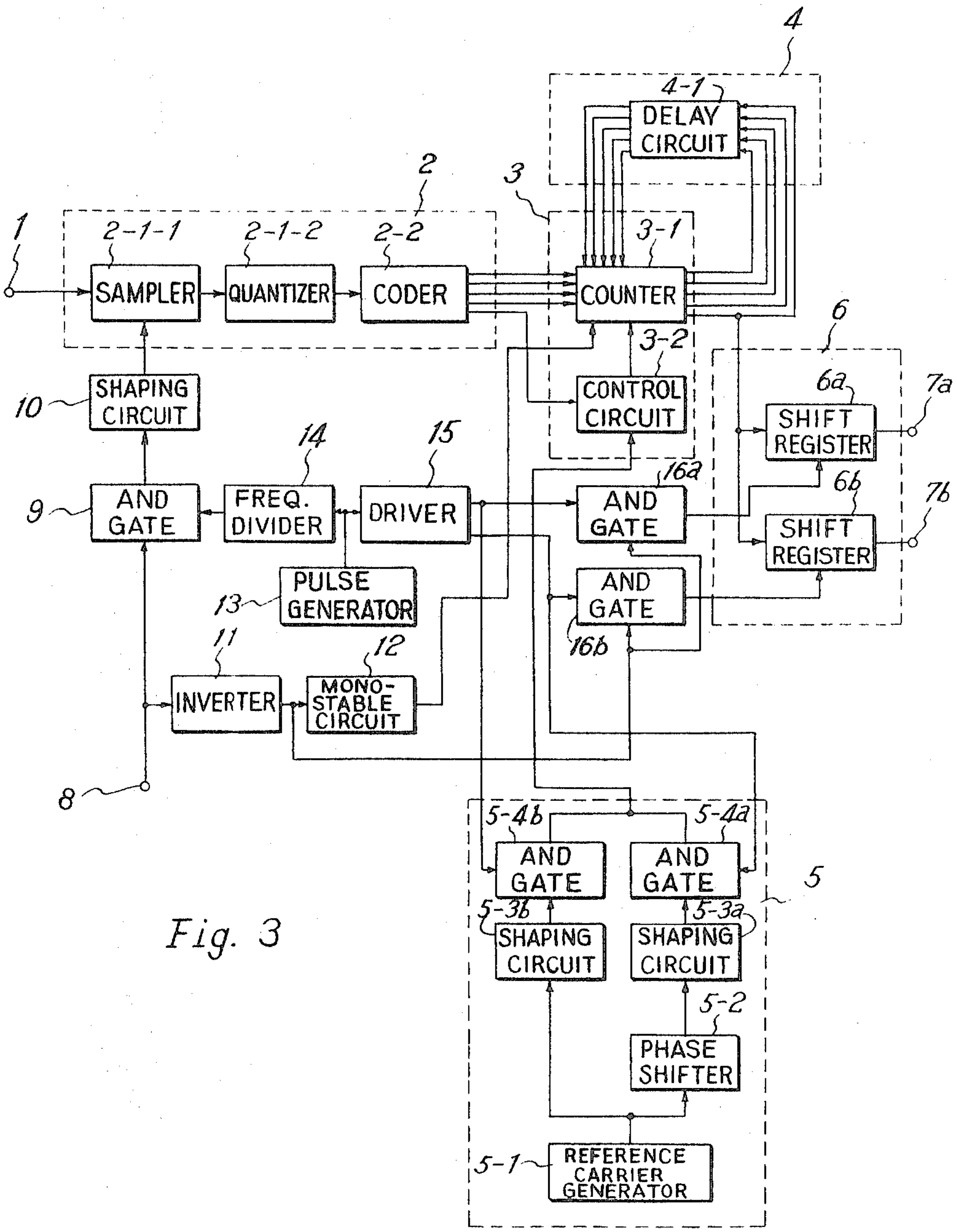
FIG. 3 is a block diagram for illustrating an embodiment of this invention applied to demodulate a four-phase phase-modulated wave.

With reference to FIG. 3, an embodiment of this invention applied to demodulate a four-phase phase-modulated wave will be described in a case where the demodulation is performed by adopting the conversion to PCM code. In this embodiment a pulse generator 13 generates a pulse train the repetition frequency of pulses of which is sufficiently higher than the frequency of the input phase-modulated wave. The repetition frequency of pulses of this pulse train is reduced to one-half thereof by a frequency divider 14 and applied to an AND gate 9. Control pulses timed with the signal elements of the input phase-modulated waves are produced by a pulse generator (not shown) by use of timing information transmitted from the sending side of the phase-modulated wave and applied to a terminal 8. This pulse generator can be designed in a manner, such as disclosed in U.S. Pat. No. 3,353,101 and British Pat. No. 1,008,821, or, U.S. Pat. application Ser. No. 656,840 filed on July 28, 1967 and British Pat. application Ser. No. 35,287/67 filed on Aug. 1, 1967. Parts of the pulse train from the frequency divider 14 are removed at the AND gate 9 by use of the control pulses so that the removed parts are timed with the vicinity of each of the characteristic instants of the phase-modulated wave. The gated pulses are then applied to a shaping circuit 10 to produce a gating pulse train the pulses of which are generated except the vicinity of each of the characteristic instants of the phase-modulated wave. This elimination of pulses is carried out so as not to detect unstable phase positions of the phase-modulated wave at the vicinity of each of the characteristics thereof. The input phase-modulated wave applied from the input terminal 1 is sampled at a sampler 2–1–1 by use of the sampled pulse train from the shaping circuit 10. The sampled signals are then applied to a quantizer 2–1–2 to quantize them to an appropriate number of quantum levels. The quantized levels are then coded to binary PCM parallel codes by the coder 2–2. In this example, the number of quantum levels is 32, and each of the coded signals is a five-unit binary PCM parallel code. The number of units of the binary PCM parallel code is determined in consideration of the number of quantum levels. The binary PCM parallel code comprises a sign digit representative of the polarity of the sampled level and four-units representative of the a absolute value of the sampled level. The four units are applied to the adding-or-subtracting parallel counter 3–1, and the sign digit is applied to the control circuit 3–2 instructing the adding or subtracting to the counter 3–1.

A reference carrier wave is generated from a reference carrier generator 5–1. If the input phase-modulated wave is a fixed-reference phase-modulated telegraphic wave, the reference carrier wave may be generated by use of an oscillator generating a highly stable oscillation frequency, such as a crystal oscillator, or by use of an oscillator synchronized with a reference signal transmitted from the sending side of the phase-modulated telegraphic wave. The reference carrier wave generated as mentioned above in the reference carrier generator 5–1 is divided into two signals, one of which passes through a phase shifter 5–2 so as to shift the reference carrier wave by 90°. Accordingly, two signals having phase difference of 90° are converted respectively to rectangular waves in shaping circuits 5–3*a* and 5–3*b* and applied respectively to AND Gates 5–4*a* and 5–4*b* as a 0° reference wave and a 90° reference wave. These AND gates 5–4*a* and 5–4*b* open and close alternately in synchronism with pulses of the pulse generator 13 since a driver 15 driven by the pulse train from the pulse generator 13 opens and closes alternately the AND gates 5–4*a* and 5–4*b*. Two rectangular waves (i.e.: the 0° reference wave and the 90° reference wave) passed respectively through the AND gates 5–4*a* and 5–4*b* are combined with each other and then applied to the control circuit 3–2. This control circuit 3–2 is designed so as to give a product result of polarities of two inputs thereof. Accordingly, this control circuit 3–2 produces, similarly as a half adder etc., a 0 output in response to the same polarity of the two inputs and a 1 output in response to different polarities of the two inputs by way of example. The adding-or-subtracting parallel counter 3–1 carries out the adding operation or subtracting operation in accordance with the output state of the control circuit 3–2. The repetition frequency of the binary PCM parallel codes generated from the coder 2–2 is the same as the opening repetition frequency of the AND gate 5–4*a* or 5–4*b* since the repetition frequency of pulses generated from the pulse generator 13 is reduced to one-half at the frequency divider 14. In other words, if the AND gate 5–4*b* is opened in synchronism with the duration of one of the binary PCM parallel codes, the AND gate 5–4*a* is opened in response to the close of the AND gate 5–4*b*; a successive one of the binary PCM parallel codes is produced in response to the close of the AND gate 5–4*a*; and the AND gates 5–4*b* and 5–4*a* are successively opened.

The processed results of the adding-or-subtracting parallel counter 3–1 are applied to a delay circuit 4–1 having a delay time equal to the interval of the sampling pulses, so that the processed results of two successive time slots are always stored in this delay circuit 4–1. Accordingly, when the AND gate 5–4*b* is opened, the processed results obtained in case of the just preceding opening period of this AND gate 5–4*b* are read out at the output of the delay circuit 4–1. This readout outputs and the four-units of the just succeeding one of the binary PCM parallel codes are added to or subtracted from each other in accordance with the output state of the control circuit 3–2. The processed results at this time are written-in to the delay circuit 4–1. At the same time, the AND gate 5–4*b* is closed and the AND gate 5–4*a* is opened, so that the similar operation is performed with reference to the other of the reference rectangular waves (the other reference having a phase position different, by 90° from the former reference). As mentioned above, the adding-or-subtracting operations in the parallel counter 3–1 are alternately carried out with reference to the 0° reference wave and the 90° reference wave, and the processed results are successively written-in to the delay circuit 4–1.

The detection-and-integration operation of each of the binary PCM parallel codes is thus digitally and time-divisionally carried out for the two reference carrier waves. These operations are repeatedly carried out during the opening period of the AND gate 9 (i.e.; the duration of a signal element of the input phase-modulated telegraphic wave except in the vicinity of the characteristic instants thereof). If the operations reach the vicinity of the characteristic instants of the input phase-modulated telegraphic wave where the phase position thereof is unstable, the AND gate 9 is closed by use of the control pulse applied from the terminal 8. In this case, since the sampler 2–1–1 cannot sample the input phase-modulated telegraphic wave, the coder 2–2 cannot produce the binary PCM parallel codes. Accordingly, the last processed results of the counter 3–1 circumlate in a loop comprising the counter 3–1 and the delay circuit 4–1. At this time, one of the control pulse applied from the terminal 8 opens AND gates 16*a* and 16*b* through an invertor 11. In response to the opening of the AND gates 16*a* and 16*b*, the last processed results (i.e.; sign digits) indicative of the polarities of detected-and-integrated output for respective signal elements of two channels transmitted by the phase-modulated telegraphic wave are successively produced at the output of the counter 3–1 and readout in respective ones of shift registers 6*a* and 6*b* to apply them to output terminals 7*a* and 7*b* respectively. When the sign digits are read out from the counter 3–1, one of the control pulses resets the state of the counter 3–1 through a monostable circuit 12 so that the counter 3–1 prepares itself for processing the just succeeding one of the binary PCM parallel codes.

Figure 4:
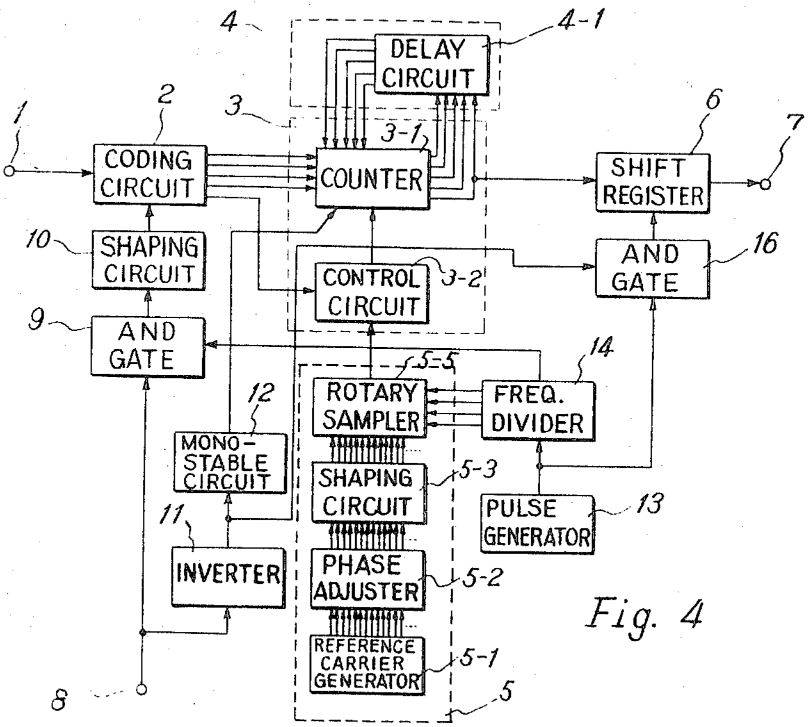
FIG. 4 is a block diagram for illustrating an embodiment of this invention applied to demodulate eight phase-modulated waves each of which is a four-phase phase-modulated wave.

The above embodiment is designed to demodulate a four-phase phaseamodulated wave. The principle of this embodiment can be applied to demodulate a plurality of four-phase phase-modulated waves by adding technical means of time-divisional operations. An embodiment for demodulating a plurality of four-phase phase-modulated waves will be described below with reference to FIG. 4. In this embodiment, parts designated by the same numerals as illustrated in FIG. 3 are the same as the respective parts shown by the same numerals in FIG. 3. Accordingly, only different parts are mainly described. A reference carrier generator 5–1 generates 16 carrier waves comprising eight pairs of which each pair is two reference waves having a phase difference of 90° and is employed for demodulating a corresponding one of eight phase-modulated telegraphic waves. These 16 reference waves are applied to a phase adjuster 5–2 to correct the respective phase positions thereof and then applied to a shaping circuit 5–3 to convert them respectively to rectangular reference waves. These 16 rectangular reference waves are applied to a rotary sampler 5–5, in which the 16 rectangular reference waves are successively sampled by use of scanning signals of four bits from a frequency divider 14. The sampled reference waves are successively applied to the binary PCM parallel counter 3–1. In this case, the rotary sampler 5–5 must be scanned over a scanning period during the duration of one of the binary PCM parallel codes. Accordingly, the repetition frequency of pulses generated from the pulse generator 13 is counted down to one-sixteenth at the frequency divider 14. Moreover, the delay circuit 4–1 has a delay time equal to the repetition period of the sampling pulses applied from the shaping circuit 10, so that the delay circuit 4–1 has a storage capacity for storing the 16 successive processed results of the counter 3–1. These 16 successive processed results are successively and time-divisionally read out to the output terminal 7 through the shift register 6 which is shifted by pulses of the pulse generator 13 when an AND gate 16 is opened by a control pulse supplied from the terminal 8 through the inverter 11.

Figure 5:
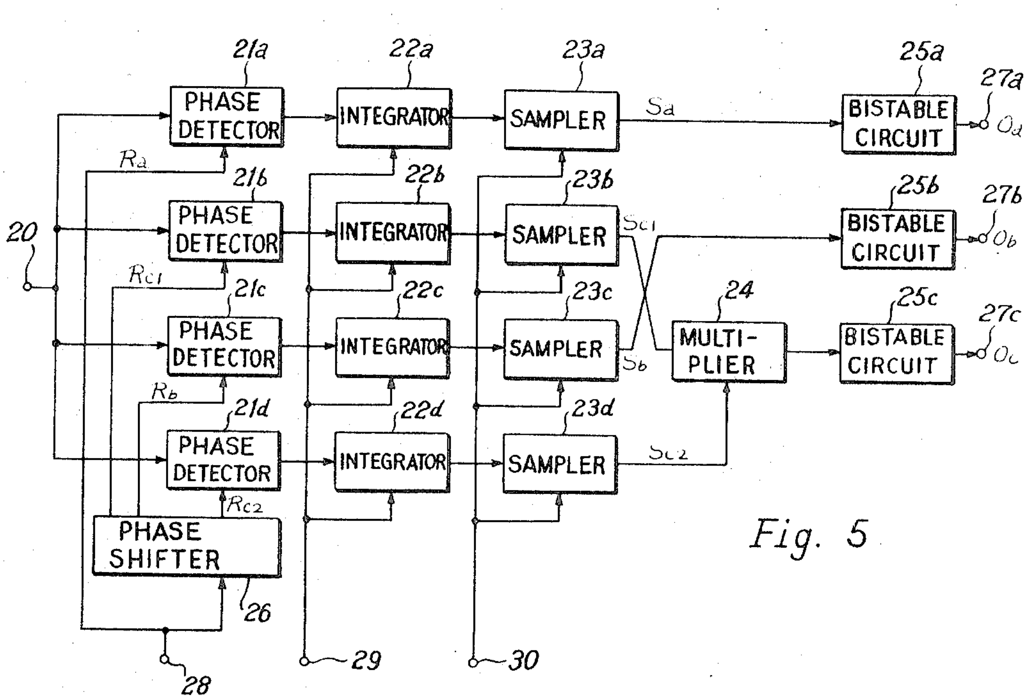
FIG. 5 is a block diagram for describing the operation of the apparatus of this invention in case of demodulating an eight-phase phase-modulated wave.

In the above-mentioned embodiments for demodulating at least one of four-phase phase-modulated telegraphic waves, telegraph signals of two channels included in each of the four-phase phase-modulated telegraphic waves can be demodulated by use of exclusive reference waves of respective channels. However, a more than eight-phase phase-modulated wave cannot be demodulated by use of the same number of reference waves without using auxiliary circuitry. The auxiliary circuitry will be described below in details. However, the operation principle of an eight-phase phase-modulated telegraphic wave will first be described with reference to FIGS. 5 and 6 for a ready understanding of the principle of this invention in case of demodulating eight-phase phase-modulated telegraphic waves.

Figure 6:
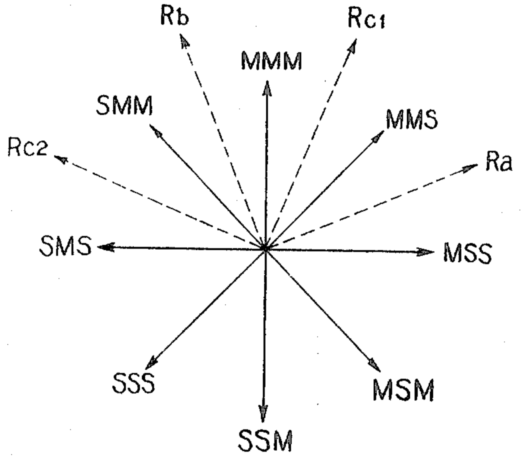
FIG. 6 is a vector diagram for describing the quantum phase positions of an eight-phase phase-modulated waves and the demodulation principle thereof.

A reference carrier wave applied from a terminal 28 is separated into four reference phase signals R*a*, R*c*1, R*b* and R*c*2 shown in FIG. 6 by use of a phase shifter 26. In this case, the relationship of eight quantum phase positions (MMM, MMS, MSS, MSM, SSM, SSS, SMS, SMM) and the phase positions of the reference waves R*a*, R*c*1, R*b* and R*c*2 are illustrated in FIG. 6. In FIG. 6, reference characters M and S indicate respectively "mark" and "space" of a signal element and are arranged in order of A channel, B channel and C channel. Accordingly, a reference MMM indicates that combined signal elements of three channels A, B and C are all mark by way of example. The eight-phase phase-modulated wave has successively any of these eight quantum phase positions MMM, MMS, MSS, MSM, SSM, SSS, SMS and SMM. This eight-phase phase-modulated wave is applied from an input terminal 20 and the respective phase-differences between the phase positions thereof and each of the reference waves R*a*, R*c*1, R*b* and R*c*2 are detected at respective phase detectors **21*a*, 21*b*, 21*c* and 21*d*. The outputs of these phase detectors 21*a*, 21*b*, 21*c* and 21*d* are respectively integrated, for the duration of the signal element of the input phase-modulated wave at respective integrators 22*a*, 22*b*, 22*c* and 22*d*, which are reset by timing pulses timed with the characteristic instants of the input phase-modulated waves and applied from a terminal 29. The timing pulses are usually produced by use of timing information transmitted from the sending side of the phase-modulated wave. The outputs of the integrators 22*a*, 22*b*, 22*c* and 22*d* are respectively sampled at samplers 23*a*, 23*b*, 23*c* and 23*d*** at a time just before the said resetting. In this case, since the sign and amplitude of respected sampled outputs S*a*, S*c*1, S*b* and S*d* of the sampler **23*a*, 23*b*, 23*c* and 23*d*** are determined by the sign and value of respective phase differences between the phase position of the input phase-modulated wave and the reference waves R*a*, R*c*1, R*b* and R*c*2, polarities of samples output S*a*, S*c*1, S*b* and S*d* are as shown in Table 1 for each of the combinations MMM, MMS, MSS, MSM, SSM, SSS, SMS and SMM of polarities of the transmitted channels A, B and C.

TABLE 1

| | Combinations of polarities of transmitted channels | | | | | | | |
|---|---|---|---|---|---|---|---|---|
| | S*a* | S*c*1 | S*b* | S*c*2 | S*c*1×S*c*2 | O*a* | O*b* | O*c* |
| MMM | + | + | + | + | + | + | + | + |
| MMS | + | + | + | − | − | + | + | − |
| MSS | + | + | − | − | − | + | − | − |
| MSM | + | − | − | − | + | + | − | + |
| SSM | − | − | − | − | + | − | − | + |
| SSS | − | − | − | + | − | − | − | − |
| SMS | − | − | + | + | − | − | + | − |
| SMM | − | + | + | + | + | − | + | + |

Accordingly, the output of a multiplier 24 can be obtained as shown in the column (S*c*1 ×S*c*2). The polarities of the sampled outputs S*a* and S*b* and of the product S*c*1 ×S*c*2 are converted to respective state signals O*a*, O*b* and O*c* at bistable circuits **25*a*, 25*b* and 25*c* as shown in Table 1 and applied to output terminals 27*a*, 27*b* and 27*c***.

As mentioned above, in case of demodulating an eight-phase phase-modulated wave, it is necessary to produce a product of two particular integrated outputs by use of a multiplier. Moreover, in case of demodulating a 16-phase phase-modulated wave, eight reference waves are necessary so that a product of four integrated outputs obtained with reference to further provided four reference waves can be obtained in addition to the circuitry shown in FIG. 5.

Figure 7:
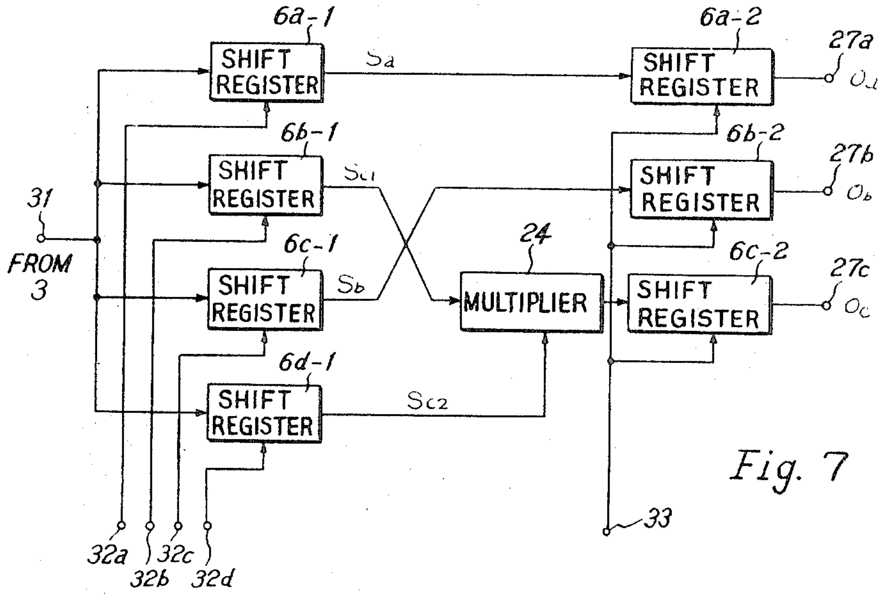
FIG. 7 is a block diagram for describing an example of a demodulation circuit demodulating the eight-phase phase-modulated wave.

Therefore, a more than eight-phase phase-modulated telegraphic waves can be demodulated in accordance with this invention as described below. Since the processed results for the respective reference waves are obtained successively and time-divisionally at the output of the adding-or-subtracting parallel counting circuit 3, at least one product of two particular and/or four processed results is produced. In case of demodulating an eight-phase phase-modulated telegraphic wave, means illustrated in FIG. 7 is provided at the output side of the counting circuit 3. The sign digit outputs of the counting circuit 3 are successively applied in a time divisional manner mentioned before through a terminal 31 to shift registers **6*a*–1, 6*b*–1, 6*c*–1 and 6*d*–1. These sign digit outputs sequentially applied are successively stored in the shift registers 6*a*–1, 6*b*–1, 6*c*–1 and 6*d*–1 by use of shift pulses applied respectively in a successive order from terminals 32*a*, 32*b*, 32*c* and 32*d***. Accordingly, the sequentially applied sign digit outputs which are integrated outputs for the respective reference waves R*a*, R*c*1, R*b* and R*c*2 are converted to parallel signals at the registers **6*a*–1, 6*b*–1, *c*–1 and 6*d*–1. The contents of the shift registers 6*a*–1 and 6*c*–1 are shifted respectively to shift registers 6*a*–2 and 6*b*–2; and the contents of the shift registers 6*b*–1 and 6*d*–1 are applied to a multiplier 24 so as to produce a product thereof, which is stored in a shift register 6*c*–2. Accordingly, if a readout pulse is applied from a terminal 33, contents of the shift registers 6*a*–2, 6*b*–2 and 6*c*–2 can be read out respectively to output terminals 27*a*, 27*b* and 27*c*** as parallel output signals O*a*, O*b* and O*c*. In this case, if sequential output signals are desirable, the contents of the shift registers **6*a*–2, 6*b*–2 and 6*c*–2** may be sequentially read out.

Figure 8:
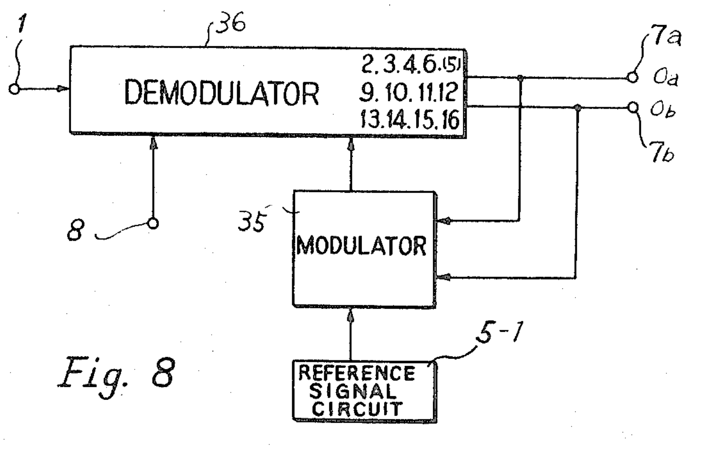
FIG. 8 is a block diagram for illustrating an embodiment of this invention demodulating a four-phase differential phase-modulated wave.

An embodiment of this invention applied to demodulate a four-phase differential phase-modulated wave is described with reference to FIG. 8. In this embodiment, a demodulator 36 is all circuits of the embodiment shown in FIG. 3 except the reference carrier generator 5–1. The reference carrier wave generated from the reference carrier generator 5–1 is applied to a modulator 35 which carries out the four-phase modulation of the reference carrier wave by use of the two output signals O*a* and O*b*. The differential phase-modulated telegraphic wave applied from the input terminal 1 is demodulated in the demodulator 36, so that two demodulated outputs O*a* and O*b* are obtained at the output terminals 7*a* and 7*b* in delaying by the duration of a signal element of the input phase-modulated wave. These outputs O*a* and O*b* are applied to the modulator 35 and phase-modulate the reference carrier wave at the modulator 35. Accordingly, the input phase-modulated wave is regenerated at the output of the modulator 35 in delaying by the duration of a signal element thereof. In other words, the demodulation principle of the differential phase-modulated telegraphic wave where the phase position of a signal element of the differential phase-modulated telegraphic wave is compared with the phase position of a just preceding signal element of the differential phase-modulated telegraphic wave is carried out, since the phase position of a signal element of the differential phase-modulated telegraphic wave is determined in accordance with the polarity of a single telegraph signal or the combination of polarities of a plurality of telegraph signals to be transmitted by use of a phase position of a just preceding signal element of reference. Accordingly, it will be understood that the differential phase-modulated wave can be demodulated in the embodiment shown in FIG. 8.

A differential phase-modulated telegraphic wave having a plurality of allowable quantum phase positions other than the four mentioned above can be also demodulated in accordance with this invention. Moreover, the modulator 35 shown in FIG. 8 may be replaced at either the input side or output side of the demodulator 36 as disclosed in U.S. Pat. No. 3,353,101 and British Pat. No. 1,008,821.

In the above description, the coding circuit 2 generates binary PCM parallel codes. However, the input phase-modulated telegraphic wave may be converted by the coding circuit 2 to binary PCM serial codes. In this case, the coding circuit 2, the counting circuit 3 and the memory circuit 4 are of the serial type, so that serial outputs of the coding circuit 3 are successively and time-divisionally processed in the counting circuit 3 by use of the memory circuit 4 of serial type and the time-divisionally applied reference waves. In other words, connection lines between the coder 2–2 and the counter 3–1 and between the counter 3–1 and the delay circuit 4–1 are each a single line.

Figure 9:
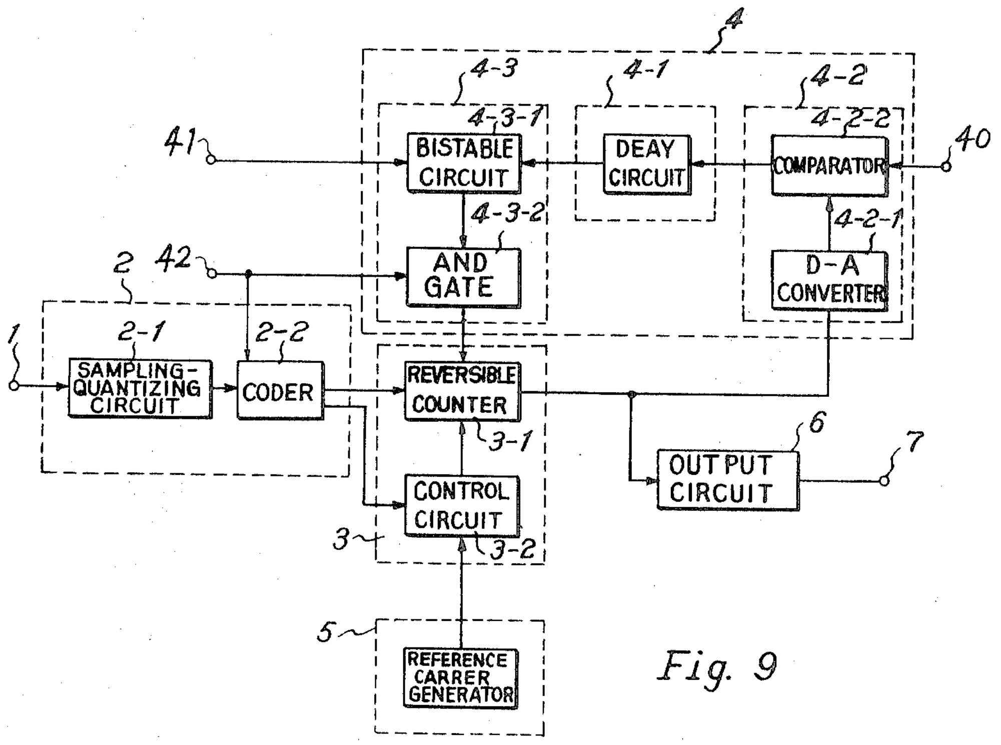
FIG. 9 is a block diagram for illustrating another embodiment of this invention.

In the above description, the input phase-modulated telegraphic wave is converted to binary PCM codes. However, other code configuration of quantized digital signal can be adopted to convert the phase-modulated telegraphic wave. With reference to FIG. 9, another embodiment of this invention in which the phase-modulated telegraphic wave is converted to binary PNM codes is described. In this embodiment, a coder 2–2 is a PNM coder controlled by counted pulses applied from a terminal 40, and the counter 3–1 is a reversible counter. The write-in circuit 4–2 comprises a D–A converter 4–2–1, and a comparator 4–2–2 comparing the output level of the D–A converter 4–2–1 and the level of a sawtooth wave applied from a terminal 40 to generate a pulse at the coincident time therebetween. Accordingly, the PNM codes processed at the reversible counter 3–1 are converted in the write-in circuit 4–2 to PPM (Pulse Position Modulation) codes. The readout circuit 4–3 comprises a bistable circuit 4–3–1 for converting the output of the delay circuit 4–1 to PWM (Pulse Width Modulation) codes by use of a reference pulse train applied from a terminal 41, and an AND gate 4–3–2 for gating the counted pulses applied from the terminal 42 by use of the PWM codes. Accordingly, the PWM codes are converted to PNM codes synchronized with PNM codes of the coder 2–2 and then applied to the reversible counter 3–1.

In this embodiment, the input phase-modulated wave is sampled and converted to PNM codes at the coding circuit 2. The PNM codes are applied successively to the reversible counter 3–1, in which the forementioned adding or subtracting operation is performed against the output of the coder 2–2 (PNM codes) and the output of the AND gate 4–3–2 (PNM codes). In this case, the adding or subtracting is controlled by a control circuit 3–2 as mentioned with reference to FIG. 3. The operation principle of this embodiment can be understood on reference to the operation of the embodiment shown in FIG. 2. Accordingly, details are omitted. The principle of this embodiment can be applied to demodulate a differential phase-modulated wave or to demodulate a more than four-phase phase-modulated wave or to demodulate a plurality of phase-modulated waves.

We claim:

1. A demodulation apparatus of at least one phase-modulated telegraphic wave comprising:
 - a coding circuit for sampling the phase-modulated telegraphic wave by use of sampling pulses the repetition frequency of which is considerably higher than the frequency of the phase-modulated telegraphic wave and for coding sampled instantaneous levels to digital signals of quantized code configuration;
 - a reference signal circuit for generating at least one reference wave having a phase position regulated so as to have a predetermined phase relationship with respect to a reference one of modulated phase positions of the phase-modulated telegraphic wave;
 - a counting circuit for performing repeatedly an adding or subtracting operation during a time substantially equal to the duration of a signal element of the phase-modulated telegraphic wave;
 - a control circuit for causing the counting circuit to perform an adding or subtracting operation in accordance with the polarity of successive ones of the sampled instantaneous levels;
 - a memory circuit for storing the processed result of the counting circuit during a time equal to the sampling period of the coding circuit and for reading out the processed result to apply it to the counting circuit; and
 - whereby the counting circuit performs an adding or subtracting operation with respect to the digital signals of the coding circuit and the processed result readout from the memory circuit, so that at least one demodulated output is derived from the counting circuit.

2. A demodulation apparatus according to claim 1, in which the counting circuit carries out repeatedly said adding or subtracting operations during a time slightly shorter than the duration of the signal element of the phase-modulated telegraphic wave.

3. A demodulation apparatus according to claim 1, in which the phase-modulated wave has more than four quantum phase positions to transmit a plurality of telegraphic signals, the reference carrier circuit generates a plurality of predetermined reference waves, and the counting circuit carries out time divisionally the adding or subtracting operation with respect to the predetermined reference waves.

4. A demodulation apparatus according to claim 1, in which a modulator is further provided to modulate one of the reference carrier wave, the phase-modulated telegraphic wave and the output of the counting circuit by use of the output of the counting circuit so that the apparatus demodulates at least one differential phase-modulated telegraphic wave.

5. A demodulating apparatus according to claim 1, in which a plurality of reference waves are time-divisionally generated from the reference carrier circuit in synchronism with the sampling of the coding circuit so that demodulation of a plurality of phase-modulated telegraphic waves is time-divisionally carried out at the counting circuit.